United States Patent
Koeppel

(10) Patent No.: US 9,548,480 B2
(45) Date of Patent: Jan. 17, 2017

(54) FLEXIBLE HANDLE ASSEMBLY FOR A BATTERY

(75) Inventor: Bradley Stewart Koeppel, Smyrna, GA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 343 days.

(21) Appl. No.: 14/343,491

(22) PCT Filed: Aug. 29, 2012

(86) PCT No.: PCT/IB2012/054428
§ 371 (c)(1),
(2), (4) Date: Mar. 7, 2014

(87) PCT Pub. No.: WO2013/038289
PCT Pub. Date: Mar. 21, 2013

(65) Prior Publication Data
US 2014/0212725 A1 Jul. 31, 2014

Related U.S. Application Data

(60) Provisional application No. 61/533,975, filed on Sep. 13, 2011.

(51) Int. Cl.
*H01M 2/10* (2006.01)

(52) U.S. Cl.
CPC ......... *H01M 2/1066* (2013.01); *H01M 2/1022* (2013.01); *H01M 2/1005* (2013.01); *Y10T 29/49108* (2015.01)

(58) Field of Classification Search
CPC H01M 2/1005; H01M 2/1066; H01M 2/1022; Y10T 29/49108
See application file for complete search history.

(56) References Cited

U.S. PATENT DOCUMENTS

| | | |
|---|---|---|
| 5,633,095 A | 5/1997 | Ishikawa |
| 5,777,316 A | 7/1998 | Horie |
| 6,341,710 B1 | 1/2002 | Danielson |
| 2003/0142917 A1 | 7/2003 | Merrick |
| 2005/0045040 A1 | 3/2005 | McCombs |
| 2006/0088377 A1 | 4/2006 | Rejman |
| 2006/0174878 A1 | 8/2006 | Jagger |
| 2008/0199771 A1 | 8/2008 | Chiu |
| 2008/0240358 A1 * | 10/2008 | Utschig .............. A61B 6/56 378/107 |
| 2010/0288904 A1 | 11/2010 | Wang |

* cited by examiner

*Primary Examiner* — Ula C Ruddock
*Assistant Examiner* — Lisa S Park
(74) *Attorney, Agent, or Firm* — Michael W. Haas

(57) ABSTRACT

A removable battery assembly is configured to provide electrical power to a device. The device may include, for example, an oxygen concentrator, a ventilator, a respiratory therapy device, an electromagnetic radiation therapy device, a nebulizer, and/or other devices. The battery assembly is configured to securely engage the device, while allowing for quick and easy disengagement and removal. The mechanism for disengaging the battery assembly from the device may be intuitive to users, such that users may not have to spend substantial time learning how to remove the battery assembly from engagement.

18 Claims, 4 Drawing Sheets

FLEXIBLE HANDLE ASSEMBLY FOR A BATTERY

CROSS-REFERENCE TO RELATED APPLICATIONS

This patent application claims the priority benefit under 35 U.S.C. §371 of international patent application no. PCT/IB2012/054428, filed Aug. 29, 2012, which claims the priority benefit under 35 U.S.C. §119(e) of U.S. Provisional Application No. 61/533,975 filed on Sep. 13, 2011, the contents of which are herein incorporated by reference.

BACKGROUND OF THE INVENTION

1. Field of the Invention

The present disclosure pertains to a removable battery assembly configured to be removed from a battery compartment, and, in particular, to a flexible handle assembly to draw the battery assembly out of the battery compartment such that the tensile force of the pulling causes an elongation at least a portion of the battery assembly that disengages battery assembly from the battery compartment.

2. Description of the Related Art

Devices that are powered by removable battery assemblies are known. Generally, a battery assembly is either locked into place on the device, or enclosed entirely within a compartment by a battery door that securely locks into place. Known mechanisms for securing battery assemblies to devices can be either difficult to operate or insecure. Generally, the more secure an engagement that is maintained by a securing mechanism, the more force, dexterity, and/or time it takes to disengage the securing mechanism. This may be frustrating for users and/or may result in reduced usage, breakage or increased wear caused by improper use, and/or other drawbacks.

SUMMARY OF THE INVENTION

Accordingly, one or more aspects of the present disclosure relate to a removable battery assembly. The battery assembly may comprise one or more of a battery body and a flexible handle assembly. The battery body houses an electric battery configured to provide stored energy as electrical power, and is configured to be inserted into a battery compartment of a device to provide electrical power to the device. The flexible handle assembly is affixed to the battery body, and comprises one or more of an attachment portion, a handgrip, a first support, a second support, a first protrusion, and a second protrusion. The attachment portion is mechanically coupled to the battery body. The handgrip is configured to be grasped to facilitate removal of the battery body from the battery compartment by pulling on the handgrip. The first support and the second support connect the attachment portion with the handgrip to form an opening between the attachment portion, the handgrip, the first support and the second support. The first protrusion and the second protrusion are formed on the flexible handle assembly to secure the battery assembly in the battery compartment of the device. The flexible handle assembly is configured such that responsive to the handgrip being grasped and pulled to remove the battery assembly from the battery compartment, the tension placed on the flexible handle assembly causes the flexible handle assembly to flex so that the first protrusion and the second protrusion are drawn toward each other, thereby releasing the first and the second protrusion from secure engagement with the device.

Yet another aspect of the present disclosure relates to a method of making a removable battery assembly. In some embodiments, the method comprises affixing a flexible handle assembly to a battery body configured to be inserted into a battery compartment of a device to provide electrical power to the device. The battery body houses an electric battery configured to provide stored energy as electrical power. The flexible handle assembly comprises an attachment portion, a handgrip, a first support, a second support, a first protrusion, and a second protrusion. The attachment portion is affixed to the battery body. The handgrip is configured to be grasped to facilitate removal of the battery body from the battery compartment by pulling on the handgrip. The first support and second support connect the attachment portion with the handgrip to form an opening between the attachment portion, the handgrip, the first support and the second support. The first protrusion and the second protrusion are formed on the flexible handle assembly to secure the battery assembly in the battery compartment of the device. The flexible handle assembly is configured such that responsive to the handgrip being grasped and pulled to remove the battery assembly from the battery compartment, the tension placed on the flexible handle assembly causes the flexible handle assembly to flex so that the first protrusion and the second protrusion are drawn toward each other, thereby releasing the first and the second protrusion from secure engagement with the device.

Still another aspect of present disclosure relates to a removable battery assembly. The battery assembly comprises means for housing an electric battery configured to provide stored energy as electrical power, wherein the means for housing is configured to be inserted into a battery compartment (40) of a device (42) to provide electrical power to the device; and means (16) for removing the means for housing from the battery compartment of such a device. The means for removing comprises means (26, 28) for securely engaging the battery compartment of such a device; means (20) for grasping the means for removing to apply a tension to the means for removing by pulling the means for grasping away from the battery compartment of such a device, wherein the means for removing is configured such that responsive to a tension being applied via the means for grasping, the means for removing flexes to remove the means for securely engaging from secure engagement with the battery compartment of such a device, thereby enabling the battery assembly to be withdrawn from such a device.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure.

DETAILED DESCRIPTION OF EXEMPLARY EMBODIMENTS

Figure 1:
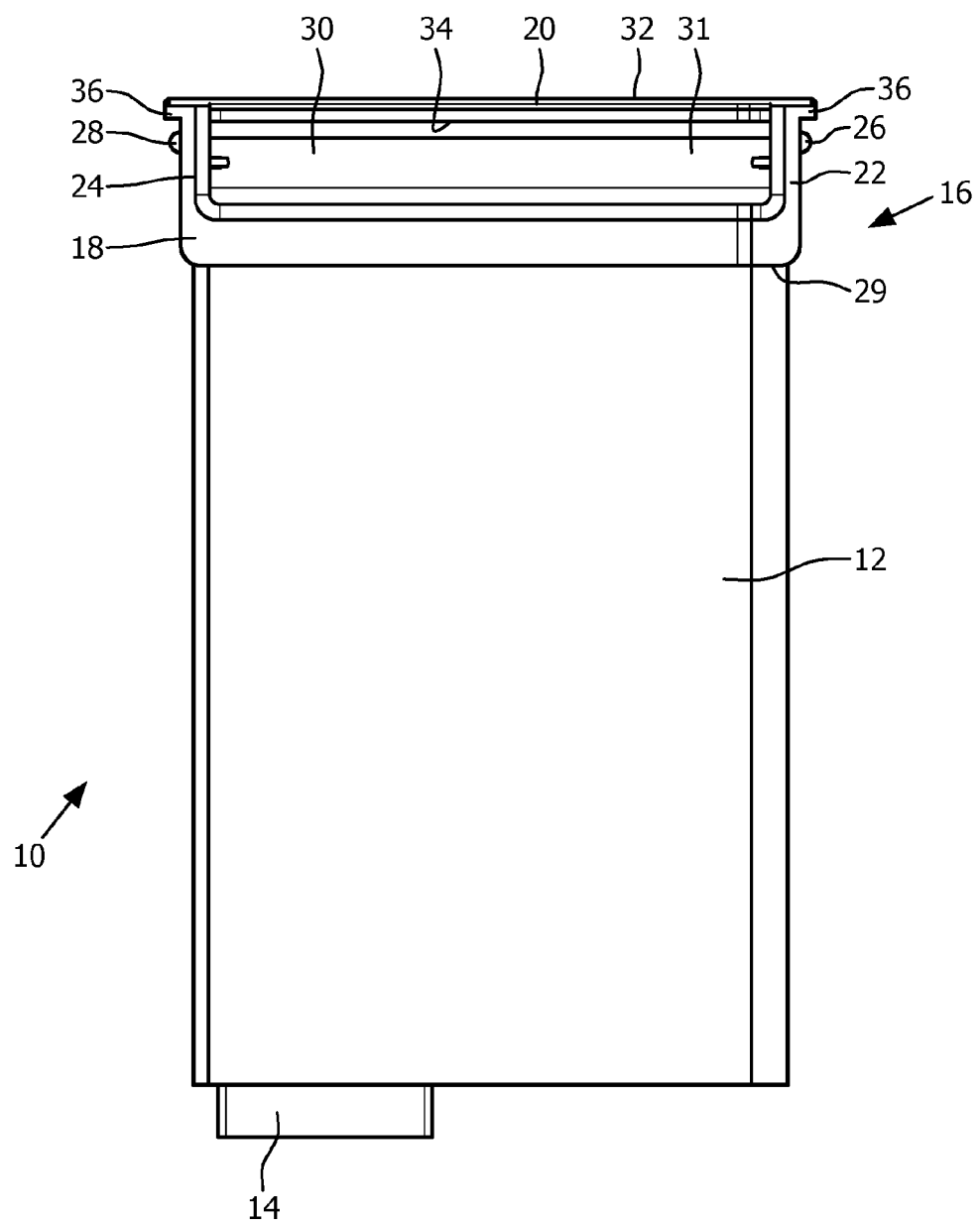
FIG. 1 is a removable battery assembly.

As used herein, the singular form of "a", "an", and "the" include plural references unless the context clearly dictates otherwise. As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other.

As used herein, the word "unitary" means a component is created as a single piece or unit. That is, a component that includes pieces that are created separately and then coupled together as a unit is not a "unitary" component or body. As employed herein, the statement that two or more parts or components "engage" one another shall mean that the parts exert a force against one another either directly or through one or more intermediate parts or components. As employed herein, the term "number" shall mean one or an integer greater than one (i.e., a plurality).

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

FIG. 1 illustrates a removable battery assembly 10 configured to provide electrical power to a device (not shown in FIG. 1). The device may include, for example, an oxygen concentrator, a ventilator, a respiratory therapy device, an electromagnetic radiation therapy device, a nebulizer, and/or other devices. Battery assembly 10 is configured to securely engage the device, while allowing for quick and easy disengagement and removal. The mechanism for disengaging battery assembly 10 from the device may be intuitive to users, such that users may not have to spend substantial time learning how to remove battery assembly 10 from engagement. In some implementations, battery assembly 10 may include a battery body 12, an electrical terminal 14, a flexible handle assembly 16, and/or other components.

Battery body 12 is configured to house an electrical battery. The electrical battery includes one or more cells that store energy (e.g., electro-chemical power). The electrical battery is configured to distribute the stored energy to the device to power the device. The electrical battery may be rechargeable. The shape of battery body 12 may correspond to a battery compartment of the device to facilitate battery body 12 being seated securely within the battery compartment. The exterior of battery body 12 may formed from a hard, rigid material to protect the battery housed therein from impacts and/or other trauma. In some implementations, battery body 12 may have a generally rectangular shape. One or more of the corners may be chamfered for comfort, convenience, and/or other factors.

Electrical terminal 14 may include one or more electrical contacts through which power is communicated electrically. The contacts may include a cathode, an anode, and/or other contact. The contacts of electrical terminal 14 may be arranged next to each other on the exterior of battery body 12 (e.g., as shown in FIG. 1), or apart from each other on battery body 12. The contacts may include male contacts, female contacts, flat contacts, and/or other types of contacts. In the implementations illustrated in FIG. 1, electrical terminal 14 is arranged on an end of battery body 12 opposite from flexible handle assembly 16. This is not intended to be limiting, as electrical terminal 14 may be placed at other locations on battery body 12.

Flexible handle assembly 16 is configured to provide a handle by which battery assembly 10 can be pulled out of the battery compartment. Flexible handle assembly 16 is further configured to secure battery assembly 10 within the battery compartment. In some implementations, flexible handle assembly 16 may include an attachment portion 18, a handgrip 20, a first support 22, a second support 24, a first protrusion 26, a second protrusion 28, and/or other components.

Attachment portion 18 is affixed to battery body 12. The attachment between attachment portion 18 and battery body 12 may be accomplished, for example, via adhesive, screws, rivets, ultrasonic welding, and/or other attachment mechanisms. The attachment between attachment portion 18 and battery body 12 is strong enough that a user can pull battery body 12 out of a battery compartment by applying force only to flexible handle assembly 16. In some embodiments, attachment portion 18 includes a pouch that holds battery body 12.

Attachment portion 18 includes a base section 29. Base section 29 is located at or near the attachment between attachment portion 18 and battery body 12. Base section 29 protrudes outward from battery body 12 such that the cross section of flexible handle assembly 16 at battery body 12 is larger than the cross section of battery body 12. As used in this context, "bigger" refers to having larger outer dimensions. This may enhance the security with which battery body 12 seats battery assembly 10 in a battery compartment while enabling battery body 12 to slide freely into and out of the battery compartment.

Handgrip 20 is configured to be grasped by the hand of a user to manipulate battery assembly 10. This includes grasping handgrip 20 to place battery assembly 10 into and/or pull handgrip 20 out of the battery compartment, carrying battery assembly 10, and/or manipulating battery assembly 10 in other ways.

Handgrip 20 is suspended away from attachment portion 18 and/or battery body 12 by first support 22 and second support 24. As such, an opening 30 is formed by attachment portion 18, handgrip 20, first support 22, and second support 24. Opening 30 is configured to receive the fingers of a user grasping handgrip 20. Opening 30 may pass completely through battery assembly 10, creating a passageway therethrough. Opening 30 may provide access to an enclosed a cavity in battery assembly 10. In such implementations, first support 22 and second support 24 may be formed contiguously with a rear support 31 that encloses the cavity on a side of battery assembly 10 opposite from opening 30.

Handgrip 20 may include an outer surface 32 and an inner surface 34. Outer surface 32 faces away from attachment portion 18 and battery body 12. Inner surface 34 is formed on a side of handgrip 20 opposite from outer surface 32, or toward attachment portion 18 and battery body 12. During use, inner surface 34 may be engaged by the fingers of the user to securely grab battery assembly 10. As such, inner surface 34 may include undulations, and/or other surface features to facilitate secure grasping of battery assembly 10. Outer surface 32 may have a form and/or finish that are designed to conform to the form and/or finish of the device in which battery assembly 10 will be installed to provide power. For example, in the illustration of battery assembly 10 provided in FIG. 1, outer surface 32 is flat and smooth to correspond to the outer surface of a device.

As is shown in FIG. 1, in some implementations, handgrip 20 is formed such that outer surface 32 extends outward past first support 22, second support 24, and/or rear support 31. Outer surface 32 is extended outward past supports 22, 24, and/or 31 by a ridge 36.

First protrusion 26 and second protrusion 28 are formed on sides of flexible handle assembly 16. Supports 26 and 28 are illustrated in FIG. 1 as being formed on first support 22 and second support 24. This is not intended to be limiting. Protrusions 26 and 28 may be formed, for example, on the sides of flexible handle assembly 16 at attachment portion 18, and/or at other positions. Protrusions 26 and 28 are formed on generally opposite sides of flexible handle assembly 16. In embodiments in which the cross section of flexible handle assembly 16 does not have generally rectangular sides (e.g., a round or oval cross section), protrusions 26 and 28 may still be formed on sides of flexible handle assembly 16 generally opposite from each other. If protrusions 26 and 28 are formed on attachment portion 18, the sides of flexible handle assembly 16 on which protrusions 26 and 28 are formed may correspond to the sides on which first support 22 and second support 24 are located.

Figure 2:
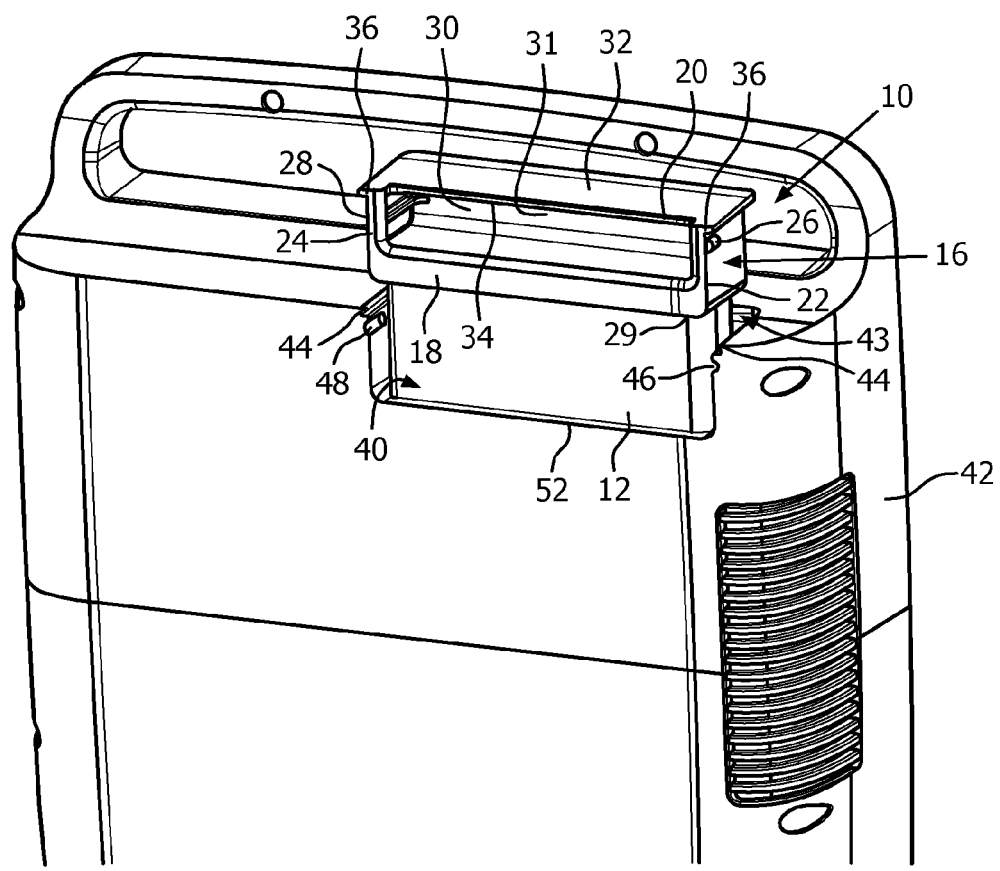
FIG. 2 is a battery assembly being positioned within a battery compartment of a device.

FIG. 2 illustrates battery assembly 10 being positioned within a battery compartment 40 of a device 42. Positioning battery assembly 10 completely within battery compartment 40 may result in device 42 being electrically coupled with battery assembly 10 to exchange power therewith. Battery compartment 40 may be accessible via an opening 43. A battery seat 44 may be formed at the edge of opening 43 for engagement by ridge 36 as battery assembly 10 is seated securely within battery compartment 40.

Device 42 may feature a first recession 46 and a second recession 48. Recessions 46 and 48 may be formed in the interior of battery compartment 40 such that as battery assembly 10 slides into place inside of battery compartment 40, first protrusion 26 and second protrusion 28 engage first recession 46 and second recession 48 respectively. The engagement between protrusions 26 and 28 and recessions 46 and 48 cooperate to hold battery assembly 10 securely in place within battery compartment 40. As device 42 is used, transported, stored, and/or otherwise manipulated or interacted with, this secure engagement operates to maintain battery assembly 10 inside of device 42. This ensures continuity of power, reduces damage and/or breakage to battery assembly 10, and/or provides other enhancements.

Figure 3:
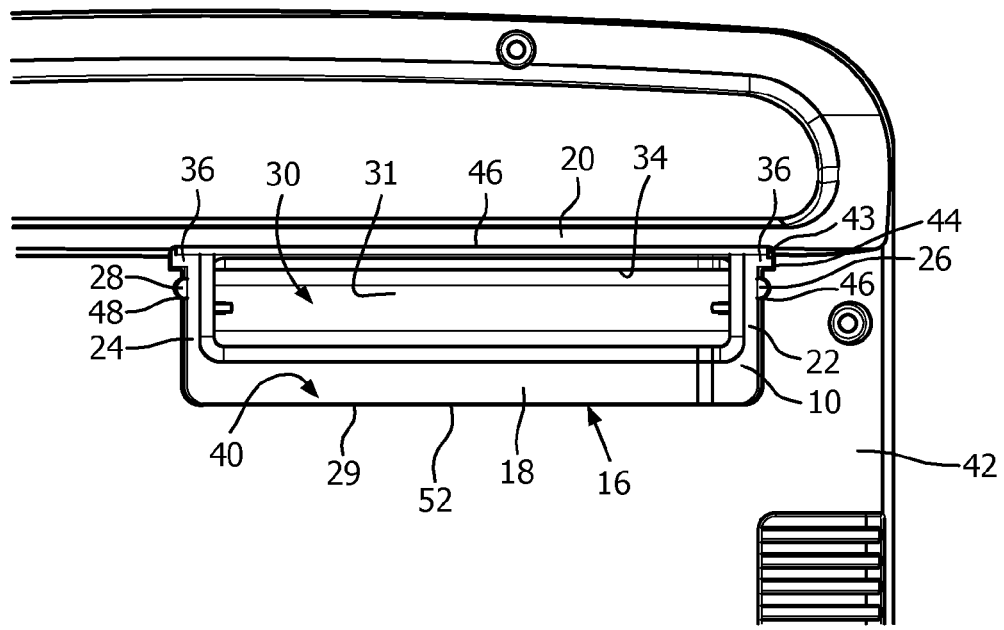
FIG. 3 is a battery assembly in position within a battery compartment of a device.

By way of illustration, FIG. 3 depicts battery assembly 10 locked securely in place in device 42. As can be seen in FIG. 3, ridge 36 is seated securely on battery seat 44 formed at the edge of opening 43. Outer surface 32 may be flush with an outer surface of device 42, or may have some other aesthetic relationship with battery assembly 10. Base section 29 of attachment portion 18 is seated on a base seat 52. Base seat 52 may be formed at an edge of opening 43, and/or formed as a change in cross section within battery compartment 40. At the position shown in FIG. 3, electrical terminal 14 (shown in FIG. 1) may be securely interfaced with a corresponding terminal (or terminals) of device 42 disposed within battery compartment 40. This facilitates the communication of power between device 42 and the electrical battery contained within battery body 12 (shown in FIGS. 1 and 2).

Flexible handle assembly 16 is formed, at least in part, from a flexible, resilient material. By way of non-limiting example, one or more of attachment portion 18, handgrip 20, first support 22, and/or second support 24 may be formed from one or more of TPR (Thermoplastic Resin), TPE (Thermoplastic Elastomer), polyester, silicone, rubber, and/or other materials. The material(s) used to form flexible handle assembly 16 may be flexible enough that responsive to a user grasping handgrip 20 while battery assembly 10 is in the position shown in FIG. 3 and pulling on battery assembly 10 to remove battery assembly 10 from device 42, the tensile force applied to flexible handle assembly 16 causes flexible handle assembly 16 to elongate in the direction of the tensile force. This is illustrated, for example, in FIG. 4.

Figure 4:
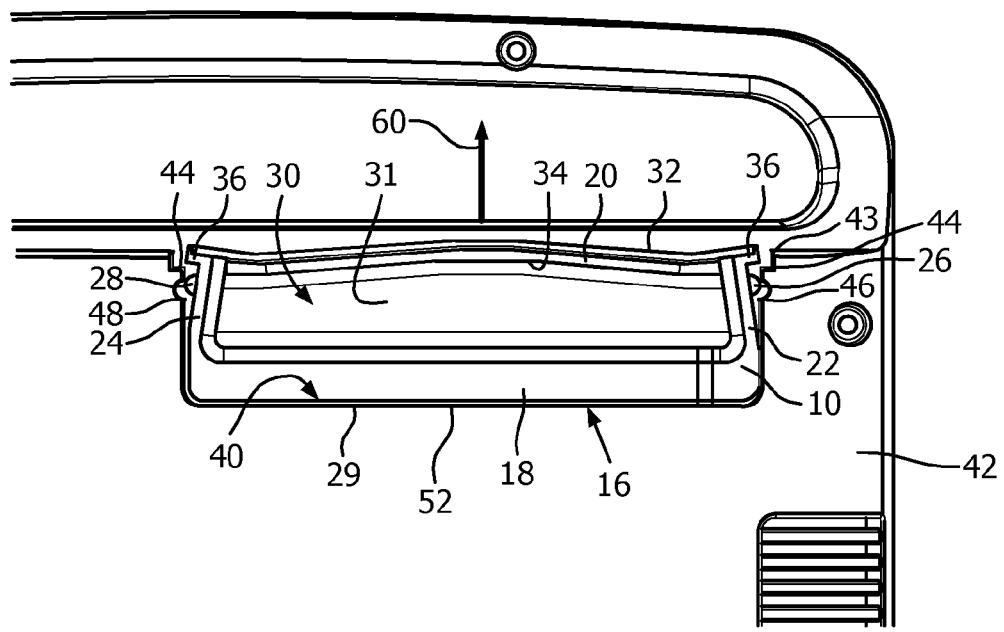
FIG. 4 is a battery assembly being removed from a battery compartment of a device.

As can be seen in FIG. 4, responsive to a tensile force being applied to handgrip 20 in the direction of an arrow 60, flexible handle assembly 16 elongates in the direction of arrow 60. The elongation causes the length of handgrip 20 in a plane that is perpendicular to arrow 60. This loss of length in the plane that is perpendicular to the direction of force (e.g., arrow 60) draws first protrusion 26 and second protrusion 28 out of first recession 46 and second recession 48, respectively, as is shown in FIG. 4. As protrusions first protrusion 26 and second protrusion 28 are drawn out of their secure engagement with device 42 at recessions 46 and 48, battery assembly 10 is freed from secure engagement with battery compartment 40 and can be easily removed (e.g., by the tensile force being applied to handgrip 20).

Thus, flexible handle assembly 16 and battery compartment 40 cooperate to form a secure engagement therebetween that is quickly and conveniently broken by a user simply grasping handgrip 20 and pulling battery assembly 10 out of battery compartment 40. If the force acting on battery assembly 10 in the direction of arrow 60 is not applied at handgrip 20 (e.g., gravity, jostling or acceleration, and/or other forces), then the aforementioned elongation of flexible handle assembly 16 may not take place. In such instances, protrusions 26 and 28 remain securely engaged with recesses 46 and 48, respectively, thereby keeping battery assembly 10 securely locked in place within battery compartment 40.

Figure 5:
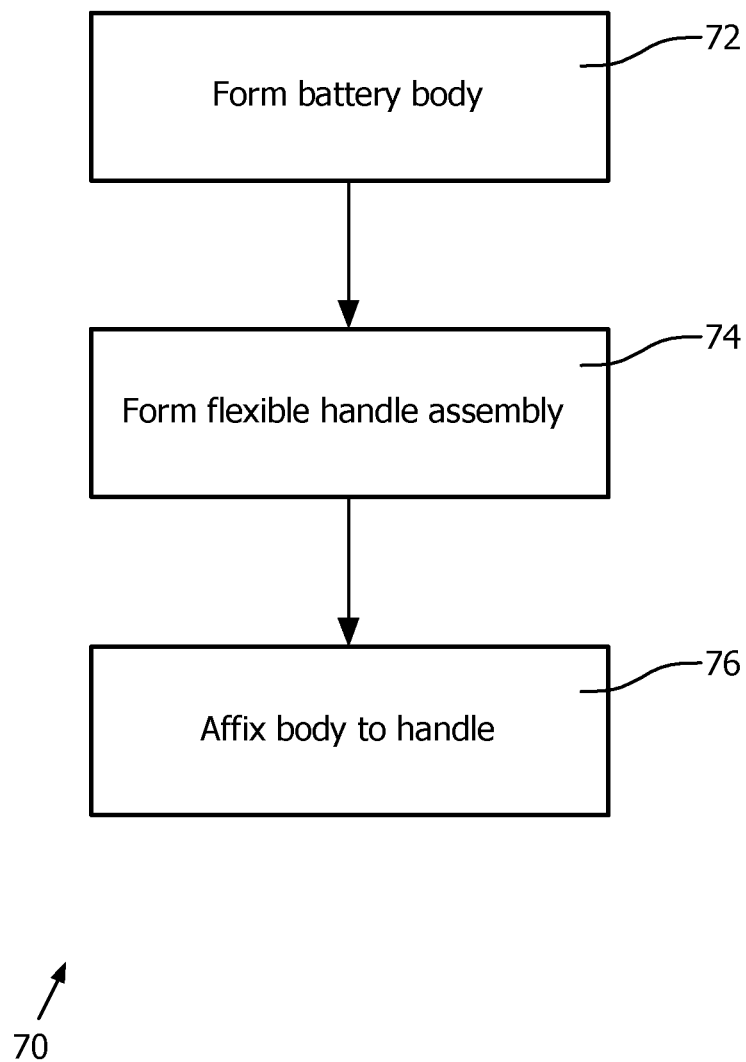
FIG. 5 illustrates a method of manufacturing a removable battery assembly.

FIG. 5 illustrates a method 70 of manufacturing a battery assembly. The operations of method 70 presented below are intended to be illustrative. In some embodiments, method 70 may be accomplished with one or more additional operations not described, and/or without one or more of the operations discussed. Additionally, the order in which the operations of method 70 are illustrated in FIG. 5 and described below is not intended to be limiting.

At an operation 72, a battery body of the battery assembly is formed. The battery body includes one or more battery cells configured to store energy that can be delivered in the form of electrical power. The battery body carries an electrical terminal through which power can be communicated with the battery cells within the battery body. In some embodiments, the battery body is similar to or the same as battery body 12 (shown in FIG. 1 and described herein).

At an operation 74, a flexible handle assembly is formed. The flexible handle assembly may include one or more of an attachment portion, a handgrip, one or more protrusions, and/or other components. The flexible handle assembly is formed from one or more flexible materials such that if a user engages the handgrip pull on the flexible handle assembly, the flexible handle assembly elongates in the direction of the pulling force. This elongation draws the protrusions formed on the flexible handle assembly toward each other. In some embodiments, the flexible handle assembly is similar to or the same as flexible handle assembly 16 (shown in FIG. 1 and described herein).

At an operation 76, the flexible handle assembly is affixed to the battery body. The resulting attachment of the flexible handle assembly to the battery body results in a user being able to manipulate the battery body by engaging the flexible handle assembly (e.g., at the handgrip). The configuration and/or operation of the flexible handle assembly may be implemented to secure the battery body within a battery compartment of a device receiving power from the battery body. In some embodiments, affixing the flexible handle assembly to the battery body may result in the formation of a battery assembly similar to or the same as battery assembly 10 (shown in FIG. 1 and described herein).

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the description provided above provides detail for the purpose of illustration based on what is currently considered to be the most practical and preferred embodiments, it is to be understood that such detail is solely for that purpose and that the disclosure is not limited to the expressly disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A removable battery assembly, the battery assembly comprising:
    a battery body that houses an electric battery configured to provide stored energy as electrical power, wherein the battery body is configured to be inserted into a battery compartment of a device to provide electrical power to the device; and
    a flexible handle assembly affixed to the battery body, wherein the flexible handle assembly comprises:
        an attachment portion that is mechanically coupled to the battery body, a handgrip configured to be grasped to facilitate removal of the battery body from the battery compartment by applying tension to the handgrip at a point of engagement,
        a first support and a second support that connect the attachment portion with the handgrip to form an opening between the attachment portion, the handgrip, the first support and the second support, wherein the first support is formed on a first side of the flexible handle assembly, wherein the second support is formed on a second side of the flexible handle assembly, and wherein the first side and second side of the flexible handle assembly are on generally opposite sides from each other, and
        a first securement portion and a second securement portion formed on the flexible handle to secure the battery assembly in the battery compartment of the device, the first securement portion being formed on the first side and the second securement portion being formed on the second side, wherein the flexible handle assembly is configured such that responsive to the handgrip being grasped and pulled to remove the battery assembly from the battery compartment, the tension applied to the flexible handle assembly causes the flexible handle assembly to flex so that the first side and the second side are drawn toward each other, thereby releasing the first and the second securement portions from secure engagement with the device, wherein the attachment portion and the handgrip are positioned along a first axis of the removable battery assembly, and wherein the first support, the second support, the first securement portion, and the second securement portion are positioned along a second axis of the removable battery assembly, the second axis different from the first axis.

2. The removable battery assembly of claim 1, wherein the tension applied to the flexible handle assembly causes the first side and second side of the flexible handle assembly to flex inwardly toward the point of engagement.

3. The removable battery assembly of claim 1, wherein the first securement portion and the second securement portion are formed on opposite sides of the flexible battery assembly, wherein the first securement portion includes a first protrusion, and wherein the second securement portion includes a second protrusion.

4. The removable battery assembly of claim 1, wherein the first axis is substantially perpendicular to the second axis and wherein the flexible handle assembly is configured such that the tension placed on the flexible handle assembly causes elongation of the flexible handle assembly along the second axis, the second axis running transverse to the handgrip, and wherein such elongation draws the first securement portion and the second securement portion toward each other.

5. The removable battery assembly of claim 1, wherein a cross-section of the flexible handle assembly at the first and second securement portions is larger than any cross-section of the battery body.

6. A method of making a removable battery assembly, the method comprising:
    affixing a flexible handle assembly to a battery body configured to be inserted into a battery compartment of a device to provide electrical power to the device, wherein the battery body houses an electric battery configured to provide stored energy as electrical power, and wherein the flexible handle assembly comprises:
    an attachment portion that is affixed to the battery body;
    a handgrip configured to be grasped to facilitate removal of the battery body from the battery compartment by applying tension to the handgrip at a point of engagement;
    a first support and a second support that connect the attachment portion with the handgrip to form an opening between the attachment portion, the handgrip, the first support and the second support, wherein the first support is formed on a first side of the flexible handle assembly, wherein the second support is formed on a second side of the flexible handle assembly, and wherein the first side and second side of the flexible handle assembly are on generally opposite sides from each other; and
    a first securement portion and a second securement portion formed on the flexible handle to secure the battery assembly in the battery compartment of the device, the first protrusion being formed on the first side and the second protrusion being formed on the second side, and wherein the flexible handle assembly is configured such that responsive to the handgrip being grasped and pulled to remove the battery assembly from the battery compartment, tension applied to the flexible handle assembly causes the flexible handle assembly to flex so that the first side and the second side are drawn toward each other, thereby releasing the first and the second securement portions from secure engagement with the device, wherein the attachment portion and the handgrip are positioned along a first axis of the removable battery assembly, and wherein the first support, the second support, the first securement portion, and the second securement portion are positioned along a second axis of the removable battery assembly, the second axis different from the first axis.

7. The method of claim 6, wherein the tension applied to the flexible handle assembly causes the first side and second side of the flexible handle assembly to flex inwardly toward the point of engagement.

8. The method of claim 6, wherein the first securement portion and the second securement portion are formed on opposite sides of the flexible battery assembly wherein the first securement portion includes a first protrusion, and wherein the second securement portion includes a second protrusion.

9. The method of claim 6, wherein the first axis is substantially perpendicular to the second axis and wherein the flexible handle assembly is configured such that the tension placed on the flexible handle assembly causes elongation of the flexible handle assembly along the second axis the second axis running transverse to the handgrip, and wherein such elongation draws the first securement portion and the second securement portion toward each other.

10. The method of claim 6, wherein a cross-section of the flexible handle assembly at the first and second securement portions is larger than any cross-section of the battery body.

11. A removable battery assembly, the battery assembly comprising:
 means for housing an electric battery configured to provide stored energy as electrical power, wherein the means for housing is configured to be inserted into a battery compartment of a device to provide electrical power to the device; and
 means for removing the means for housing from the battery compartment of such a device, wherein the means for removing comprises:
  means for securely engaging the battery compartment of such a device, wherein the means for securely engaging is formed on a first side and a second side of the means for removing; and
  means for grasping the means for removing to apply a tension to the means for removing by pulling the means for grasping away from the battery compartment of such a device, wherein the means for removing is configured such that responsive to the tension being applied via the means for grasping, wherein the means for removing flexes to remove the means for securely engaging from secure engagement with the battery compartment of such a device, and wherein the first side and second of the means for removing are drawn toward each other, thereby enabling the battery assembly to be withdrawn from such a device, wherein the mean for grasping is positioned along a first axis of the removable battery assembly, and wherein the means for securely engaging is positioned along a second axis of the removable battery assembly, the second axis different from the first axis.

12. The removable battery assembly of claim 11, wherein the means for securely engaging the battery compartment comprise at least one protrusion formed on the first side of the means for removing.

13. The removable battery assembly of claim 12, wherein the at least one protrusion comprises two protrusions arranged on generally opposing sides of the means for removing.

14. The removable battery assembly of claim 11, wherein the first axis is substantially perpendicular to the second axis, wherein the means for removing is configured such that the tension placed on the means for removing via the means for grasping causes elongation of the means for removing, and wherein such elongation draws the means for securely engaging out of secure engagement with the battery compartment of such a device.

15. The removable battery assembly of claim 11, wherein a cross-section of the means for removing at the means for securely engaging is larger than any cross-section of the means for housing.

16. The removable battery assembly of claim 3, wherein the first protrusion and the second protrusion are semi-spherical shaped.

17. The method of claim 8, wherein the first protrusion and the second protrusion are semi-spherical shaped.

18. The removable battery assembly of claim 13, wherein the two protrusions are semi-spherical shaped.

* * * * *